(12) United States Patent
Gibb

(10) Patent No.: US 12,627,255 B1

(45) Date of Patent: *May 12, 2026

(54) SELF-DEPLOYING FLEXIBLE SOLAR ARRAY

(71) Applicant: Lockheed Martin Corporation, Bethesda, MD (US)

(72) Inventor: John L. Gibb, Sunnyvale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/923,213

(22) Filed: Oct. 22, 2024

Related U.S. Application Data

(62) Division of application No. 18/171,338, filed on Feb. 18, 2023, now Pat. No. 12,155,347.

(60) Provisional application No. 63/311,752, filed on Feb. 18, 2022.

(51) Int. Cl.
    *H02S 30/20*     (2014.01)
    *B64G 1/44*     (2006.01)

(52) U.S. Cl.
    CPC .............. *H02S 30/20* (2014.12); *B64G 1/443* (2013.01)

(58) Field of Classification Search
    CPC ......... H02S 30/20; H02S 10/40; B64G 1/443; B64G 1/2224; B64G 1/2225; B64G 1/2222; B64G 1/2229; H01Q 15/161; H01Q 15/20; H01Q 1/288
    See application file for complete search history.

(56) References Cited

U.S. PATENT DOCUMENTS

| | | | | |
|---|---|---|---|---|
| 5,296,044 | A | * | 3/1994 | Harvey .................. H02S 30/20 136/292 |
| 6,028,570 | A | * | 2/2000 | Gilger .................. H01Q 15/161 343/915 |
| 6,150,995 | A | * | 11/2000 | Gilger ...................... B64G 1/66 343/915 |
| 2003/0010869 | A1 | * | 1/2003 | Kawaguchi .......... H01Q 15/161 244/172.6 |
| 2009/0126775 | A1 | * | 5/2009 | White ...................... H02S 30/20 136/245 |
| 2011/0315192 | A1 | * | 12/2011 | Swatek ................... H02S 20/30 136/246 |
| 2014/0028240 | A1 | * | 1/2014 | Heumann ................. H02J 7/35 320/101 |
| 2023/0387601 | A1 | * | 11/2023 | Murphey ............. H01Q 15/161 |

\* cited by examiner

*Primary Examiner* — Andrew J Golden

(57) ABSTRACT

Provided herein are various enhancements for solar arrays and photovoltaic systems for spacecraft, vehicles, and other applications. In one example, an assembly includes a base layer having a generally circular shape and comprising a plurality of gores interspersed by radial folds. The assembly includes a photovoltaic array coupled to the gores, and a tensioning element configured to apply circumferential tension about a central node of the base layer. The assembly includes a structural element disposed about an outer perimeter of the base layer against which the circumferential tension is conveyed for deployment of the base layer from a stowed configuration into a deployed configuration.

9 Claims, 6 Drawing Sheets

Boom Lenticular Top/Bottom View

400

410

Boom Lenticular Cross-Section View

410

401

1

SELF-DEPLOYING FLEXIBLE SOLAR ARRAY

RELATED APPLICATIONS

This application is a divisional of U.S. patent application Ser. No. 18/171,338, titled "SELF-DEPLOYING FLEXIBLE SOLAR ARRAY," filed Feb. 18, 2023; which claims the benefit of and priority to U.S. Provisional Patent Application 63/311,752, titled "HUBLESS FLEXIBLE SOLAR ARRAY," filed Feb. 18, 2022, and which is hereby incorporated by reference in its entirety.

TECHNICAL BACKGROUND

Photovoltaic cells have been employed to form solar arrays on satellites, space probes, or space vehicles and provide electrical power to on-board systems. However, use of photovoltaic arrays has always been challenging due to the severe packaging, weight, and deployment requirements of launching to space. Typically, rolled or folded solar arrays are packaged to fit into an envelope of a launch vehicle fairing, and then unfurled once in orbit or in space.

Various types of compact and deployable solar arrays have been devised over the years. These include umbrella arrays, Scheel fold-type arrays (hub folded "wrap rib"), flat segmented fan arrays, fold-up fan arrays, conic roll-up arrays, Kaplan-type arrays (U.S. Pat. No. 4,030,102), Ultraflex arrays (U.S. Pat. No. 5,296,044), and others. However, all of the aforementioned array types have various drawbacks and limitations. For example, the Ultraflex hub-deployed circular flexible arrays employ complex hubs with many mechanisms and moving parts which do not scale in size easily. One solar array example is the Multi-Mission Modular Array (U.S. Pat. No. 10,546,967), which is a solar array with multiple deployment mechanisms to extend a Z-folding flexible rectangular-shaped blanket, and the blanket is tensioned between two spreader bars. Another solar array example is the Roll Out Solar Array (ROSA) flexible array (U.S. Pat. No. 9,604,737), which is deployed from tightly packed rolls to a rectangular-shaped blanket. The iROSA arrays of the International Space Station employ such technology. However, the ROSA type of arrays remain quite non-rigid and flexible even after deployment, and require a small radius of curvature for the relatively fragile photovoltaic materials while in the stowed configuration, which requires use of a backer foam material which can degrade over time and cause thermal problems in use.

Overview

Provided herein are various enhancements for solar arrays and photovoltaic systems for spacecraft, vehicles, and other applications. These solar arrays are stowed in a compact, robust, and radially folded configuration for initial transport. Then, the solar arrays can be automatically and passively deployed without the use of motors, servos, or other complex hub mechanisms, such as after a spacecraft has reached a targeted orbit or trajectory. A lightweight "hubless" arrangement is thus employed which includes a base layer membrane tensioned by a central hoop tension member, and further supported by a collapsible perimeter structure. While circular (or generally circular) and hexadecagon-shaped examples are discussed in the included Figures, other shapes can instead be employed using similar materials, techniques, and structures.

In one example, an assembly includes a base layer having a generally circular shape and comprising a plurality of gores interspersed by radial folds. The assembly includes a photovoltaic array coupled to the gores, and a tensioning element configured to apply circumferential tension about a central node of the base layer. The assembly includes a structural element disposed about an outer perimeter of the base layer against which the circumferential tension is conveyed for deployment of the base layer from a stowed configuration into a deployed configuration.

In another example, a method includes forming an assembly comprising a photovoltaic array bonded to a circular and flexible base layer having radial folds that define sections, that when folded, establish a stowed configuration for the assembly with an exposed area of one section. The method includes establishing, with a tension member, a hoop tension about a center of the assembly that applies radial tension to the base layer for deployment of the assembly from the stowed configuration into a deployed configuration.

In yet another example, a device comprises a solar array assembly comprising photovoltaic elements bonded to a circular and flexible base layer having radial folds that define sections, that when folded, establish a stowed configuration for the solar array assembly with an exposed area of one section. The solar array assembly comprises a tension member configured to apply a hoop tension about a center of the base layer that applies radial tension to the base layer for deployment of the assembly from the stowed configuration into a deployed configuration. The solar array assembly comprises a perimeter structure about a circumference of the base layer against which the radial tension is applied during deployment of the solar array assembly.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

The examples herein describe an enhanced deployable solar array to provide solar or photovoltaic-generated electrical power to vehicles, personnel, satellites, spacecraft, or planetary/lunar ground or space stations. This solar array operates by deploying a lightweight hubless photovoltaic assembly comprising a base layer membrane or fabric that is supported by a low-mass collapsible perimeter structure.

This photovoltaic assembly can be circular, elliptical, multisided polygonal, semi-circular, semi-elliptical, or a semi-complete multi-sided polygon. The photovoltaic assembly is low-cost to enable development of affordable constellations of small and medium size spacecraft. The photovoltaic array can also be made stiffer and stronger than conventional rigid or flexible arrays to enable high-G, high thrust missions, missions demanding high agility or maneuverability, or for repositioning a spacecraft while the arrays are deployed and continuing to generate power.

The hubless solar array discussed herein can include a base layer having a generally circular shape and comprising a plurality of radial folds. A photovoltaic array is coupled to the base layer. A tensioner element is coupled to a central region of the base layer, such as about a central node or center hole. A perimeter structural element is coupled to an outer region of the base layer. The perimeter structural element might comprise joints positioned at each of the radial folds such that when in a stowed configuration the joints are in a folded configuration and when in a deployed configuration the joints are in an expanded configuration to support the generally circular shape of the base layer. In one example, the perimeter structural element comprises a series of interconnectable hollow rods having an internal space with a circular elastic or spring tensioned member threaded therethrough.

Figure 1:
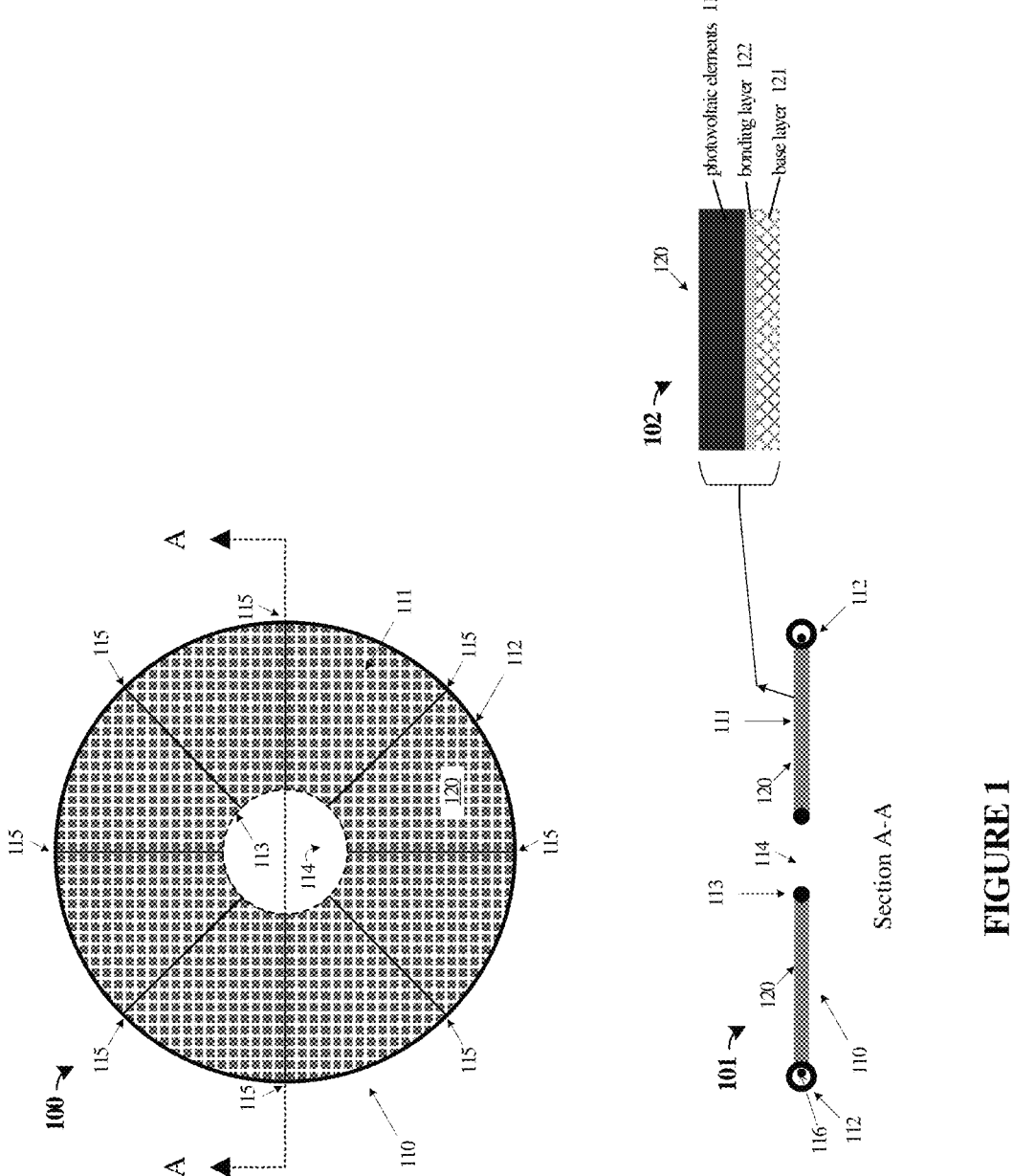
FIG. 1 illustrates a solar array assembly in an implementation.

Turning now to an example implementation of a self-deploying solar array, FIG. 1 is presented. FIG. 1 includes views 100-102. View 100 of FIG. 1 shows an overhead or plan view of solar assembly 110 in a deployed configuration. Solar assembly 110 includes membrane assembly 120 which comprises photovoltaic elements 111, perimeter structural element 112, and tensioner 113, among other elements seen in views 101-102. Photovoltaic elements 111 comprise a facing layer of membrane assembly 120 in view 100, with perimeter structural element 112 positioned at a circumferential edge and tensioner 113 positioned about central node 114.

Cross-sectional view 101 is also shown at section A-A, which highlights a side view and thickness of solar assembly 110. As can be seen in view 101, perimeter structural element 112 can comprise hollow members through which optional perimeter tension element 116 can be included. Tensioner 113, positioned about central node 114, can comprise a ring or generally circular element which exerts a hoop tension about central node 114, which then responsively exerts a radial tension onto membrane assembly 120. One or more radial folds 115 are also included on membrane assembly 120, which are typically formed in a base layer of membrane assembly 120, and can establish edges or borders between sections of photovoltaic elements 111. A photovoltaic array formed from photovoltaic elements 111 can thus comprise sections each corresponding to individual gores of membrane assembly 120 and having section edges at each of radial folds 115.

View 102 is a detailed view illustrating a stackup of membrane assembly 120. In view 102, base layer 121 forms a bottom or base onto which photovoltaic elements 111 are bonded via bonding layer 122. Base layer 121 comprises a flexible medium, such as a membrane or fabric, which can be circular as shown in FIG. 1, or have alternate shapes such as elliptical, or multi-sided polygonal (or semi-circular, semi-elliptical, or a semi-complete multi-sided polygon). Base layer 121 can be a continuous material such as a polyimide (e.g., Kapton) sheet, textured or embossed Kapton, aluminized Kapton, Mylar, polyester films, a metallic foil, or a woven mesh or cloth material, or may be fabricated in segments to be joined in an assembly. When materials such as polyimide or Kapton are employed, no foam backer is required, leading to better thermal performance and durability since many foam materials degrade in vacuum, solar charged-particle radiation, and high-ultraviolet illumination environments.

Base layer 121 is the carrier for photovoltaic elements 111 comprising separately-manufactured solar cell assemblies or modules bonded onto base layer 121, or thin film photovoltaic materials applied directly by coating, depositing, spraying or inkjet processing. Base layer 121 is attached to perimeter structural element 112 on an 'outside' circumferential edge and to tensioner 113 on an 'inner' edge or central node. Base layer 121 can have central node 114 forming an aperture or void in the central node/region due to the location of tensioner 113, although this is not required, with central node 114 filled or omitted. Base layer 121 can be attached to perimeter structural element 112 comprising a perimeter frame and to tensioner 113 with corresponding sleeves formed into base layer 121 by folding the edges of base layer 121 over or forming circular pockets within a medium of base layer 121. Thus, central node 114 of the base layer can comprise a sleeve having a circular arrangement through which the tensioning element is fitted. Seams of these sleeves or pockets can be secured by adhesive, fabric/material welding, or mechanical means (stitching, riveting, etc.), or a combination of these methods. In view 102, bonding layer 122 is shown attaching photovoltaic elements 111 onto base layer 121. Bonding layer 122 can comprise various adhesives, such as silicone, silicone paste, epoxy material, glues, tapes, or other materials. Bonding layer 122 can be selected to provide a level of flexibility or rigidity suitable for interfacing between a generally flexible or foldable base layer 121 and photovoltaic elements 111. Bonding layer 122 also can provide thermal conduction for the photovoltaic elements 111 onto the base layer 121. The base layer 121 serves as a radiator surface for the photovoltaic elements 111 and its surface properties for absorptivity or emissivity may be selected or enhanced via coatings such as metallization, paints, dyes, or admixtures to the base layer material.

Perimeter structural element 112 can comprise a frame having series of hollow tubes or tube segments with interlocking devices, such as a ferrule, between individual segments and collated with an internally routed a cable or cord. The interlocking features between individual tube segments can create a rigid and strong perimeter frame when deployed, providing high deployed stiffness and resonant frequency, along with high strength to the fully deployed solar assembly. Hollow tube segments forming perimeter structural element 112 can have a similar configuration to tent poles with elastic 'shock' cords embedded within hollow structural tubes. Alternatively, perimeter structural element 112 can comprise multi-jointed or double-jointed structural rods with internal tension elements. For example, high elasticity joints or hinges might be employed to couple individual segments, including Soss-style hinges. Target elastic recovery might be provided by superelastic nitinol materials having >8% elastic recovery properties. Polymeric materials can be employed, or high strain composites. Lenticular cross-sectional shapes can be employed, along with other cross-sections, including circular.

Tensioner 113 comprises a tension element for base layer 121 forming solar assembly 110, which may consist of a cable or cord with an extension spring, or an elasticated cord, that functions as a garter spring to provide hoop tension about an inner perimeter of base layer 121 at central node 114. In solar assembly 110, no rigid or complex mechanical hub is included, making solar assembly 110 essentially hubless. Instead, tensioner 113 can be a flexible or stretchable line and is placed under tension. Thus, tensioner 113 provides a circumferential or hoop tension around the associated central node 114 without requiring rigid structural elements forming a hub (e.g. rigid frames, spokes, or crossbar elements), and lacks any motors, servos, mechanisms, gears, or other active deployment means. Advantageously, the tension provided by tensioner 113 onto base layer 121 provides for deployment of solar assembly 110 from a stowed or folded configuration into a deployed configuration. The tension provided by tensioner 113 acts against a structure provided by perimeter structural element 112. Thus, automatic self-deployment of solar assembly 110 can be achieved, in a spring-up or pop-up manner.

Photovoltaic elements 111 each comprise an array or sub-array of photovoltaic/solar cells or photovoltaic elements capable of generating electrical power responsive to incident light. In operation, photovoltaic elements 111 will be positioned to receive incident sunlight to produce direct current (DC) outputs of a particular voltage and current. The output voltage and current can vary depending on the intensity of the incident light and composition or arrangement of the photovoltaic cells. The individual photovoltaic cells might comprise various semiconductor-based cells, including III-V semiconductors (e.g., GaAs, GaInP, GaInAs) single or multi-junction cells, silicon-based wafers, CdTe, CIGS, Perovskites, or thin film solar cells, among others. Various series or parallel connections of photovoltaic cells can be made to produce desired output currents and voltages, as well as for redundancy and failure mitigation. Various power routing/distribution links and control circuitry/links can be included with photovoltaic elements 111 to route output power to a power system of a corresponding vehicle or device, and to control and monitor various aspects of functionality associated with photovoltaic elements 111. Routing of links, flexible circuits, or wires associated with photovoltaic elements 111 can be established in a generally radial manner to reach either the perimeter or central node of solar assembly 110, from which the routing can be further established to reach a corresponding vehicle, device, or power system used to collect power from photovoltaic elements 111.

In some examples, photovoltaic elements 111 can be formed into a circular arrangement that overlays base layer 121 entirely, or in an approximate fashion. In this example, hinges or flexible portions of photovoltaic elements 111 can be employed at each of folds 115 which establish gores or sections of membrane assembly 120. In other examples, photovoltaic elements 111 can comprise a series of sections or portions which are individually bonded to base layer 121 with edges or gaps between each section of photovoltaic elements 111 to allow for folding or bending of base layer 121. Thus, gores or sections of membrane assembly 120 can be defined by independent sets of photovoltaic elements 111 which are all bonded to a common or shared base layer 121. Photovoltaic elements 111 might be mounted onto a substrate before being bonded to base layer 121. When substrates are employed, a flexible substate is preferred but not required. For example, flexible, rigid, or semi-rigid substrates are possible. Example substates include carbon fiber substrates, aluminum substrates, and honeycomb substrates of various materials. In some examples, base layer 121 comprises the substrate for photovoltaic elements 111.

Figure 2:
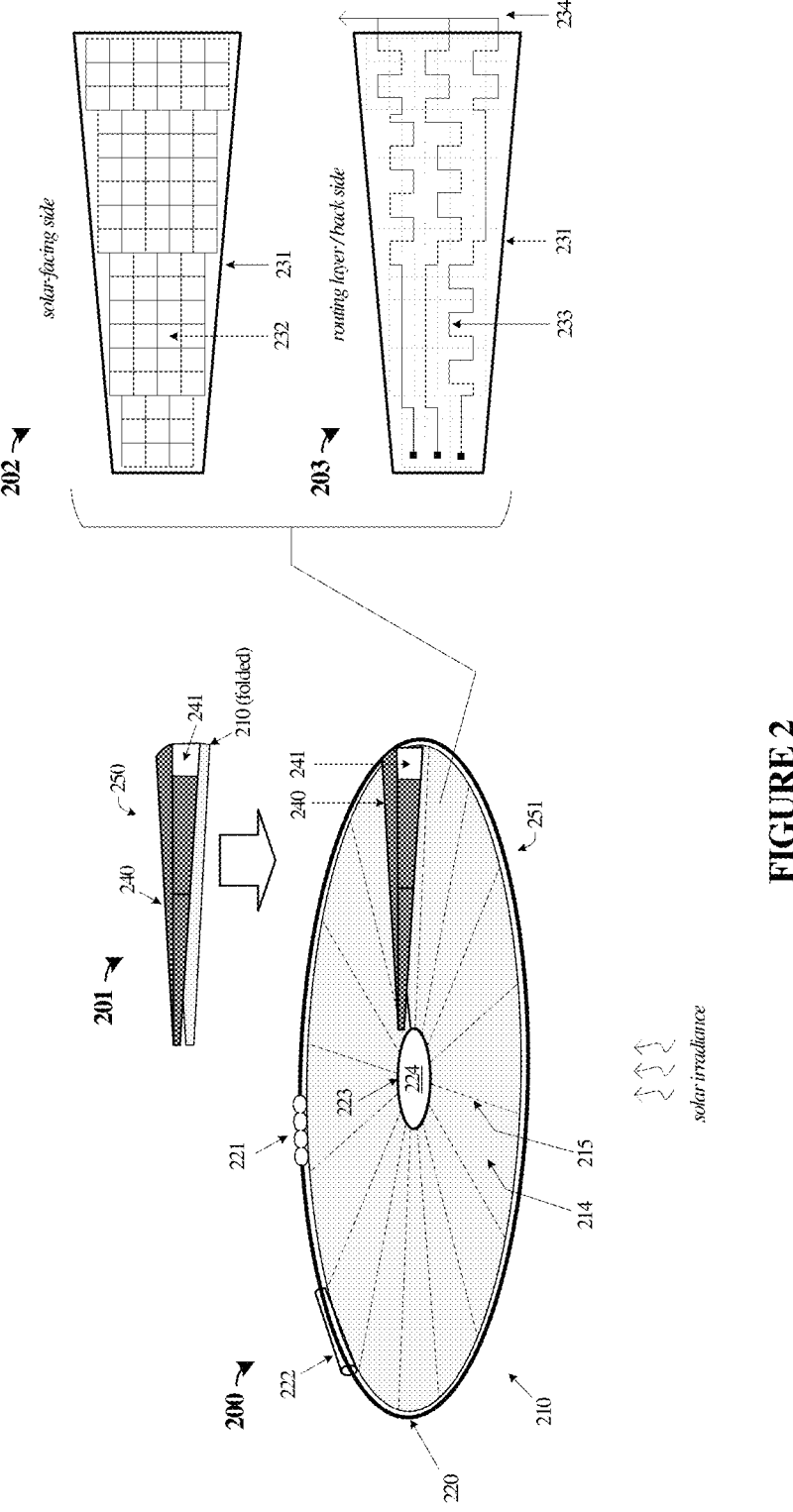
FIG. 2 illustrates a solar array assembly in an implementation.

Turning now to another example implementation of a self-deploying solar array, FIG. 2 is presented. FIG. 2 includes views 200-203. View 200 shows an isometric view of an underside of solar array assembly 210 in deployed configuration 251. View 201 shows an isometric view of solar array assembly 210 in a folded or stowed configuration 250. Solar array assembly 210 includes base layer 214 having a generally circular shape and comprising a plurality of gores interspersed by radial folds 215. Solar array assembly 210 also includes perimeter structural element 220 and central tensioner 223, optional storage boom 240, and wiring harness 241.

View 201 shows an isometric view of solar array assembly 210 in compact stowed configuration 250 which also includes boom structure 240. Storage boom 240 can hold a stowed (i.e., un-deployed) or folded solar array during packaging, integration, and launch phases until deployment. Also, wiring harness 241 is shown which electrically couples photovoltaic elements forming solar array assembly 210 to other systems, such as a vehicle or spacecraft. In view 201, solar array assembly 210 has been folded to have only a single section exposed to solar irradiance or illumination. This configuration allows for a portion of the power provided by the photovoltaic elements to be provided downstream through wiring harness 241 for powering corresponding spacecraft, vehicles, and the like before deployment, and during deployment. In this manner, at least a portion of the total power output of solar array assembly 210 can be provided throughout all phases from initially stowed to fully deployed.

Turning now to base layer 214, a generally circular membrane is formed having an outer perimeter and a central node or central void (224). Positioned about the outer perimeter is perimeter structural element 220 which includes perimeter tensioning element 221. Perimeter structural element 220, when disposed about an outer perimeter of base layer 214, provides a rigid structure against which a circumferential tension of a central tension member is conveyed (through a material of base layer 214) for deployment of base layer 214 from a stowed configuration into a deployed configuration.

Perimeter structural element 220 can be formed from a series of hollow tubes or other structural members, such as shown for structural member 222, through which a tensioning cord or wire can be strung or threaded. In some examples, the entire circumference of the tensioning cord can be formed from a tensioning material, such as a spring, spring material, memory metal, clastic bands, shock cords, or other self-tensioning materials. In other examples, such as shown for perimeter tensioning element 221 in FIG. 2, one or more discrete tensioning elements can be included, such as springs or memory metals, inline along the length of a wire, cable, or other circumferential member which then provides hoop tension to the circumferential member. Perimeter tensioning element 221 can comprise members having self-tension (e.g., springs, clastic cords), pre-tension (e.g., pre-tensioned wires), or externally provided tension (e.g., motor that winds tension to open/deploy). Structural member 222 is one example of a rigid or semi-rigid member, of which a series of such members are typically included about the perimeter of base layer 214. These structural members provide a structure against which the tension provided to base layer 214 by central tensioner 223 is applied. Tensioner 223 comprises a tensioning element configured to apply circumferential tension about central node 224 of base layer 214. As will be discussed, the structural members are initially in a stowed configuration and folded along with base layer 214, but the integrated perimeter tensioning element 221 deploys perimeter structural element 220. Thus, perimeter tensioning element 221 is only employed to deploy perimeter structural element 220 into a deployed configuration, such as a hoop or circular arrangement seen in view 200.

Figure 3:
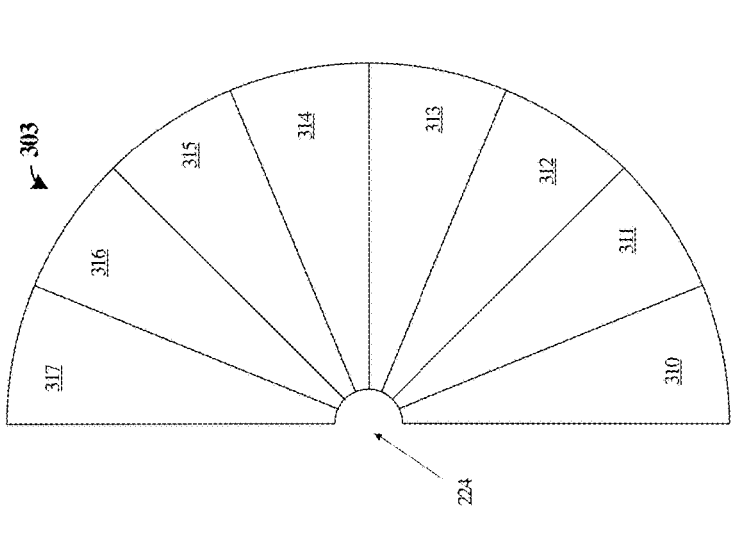
FIG. 3 illustrates techniques for folding a solar array assembly in an implementation.
Figure 3:
Figure 3:
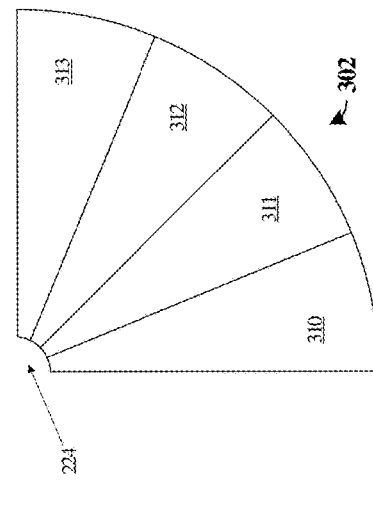
Figure 3:
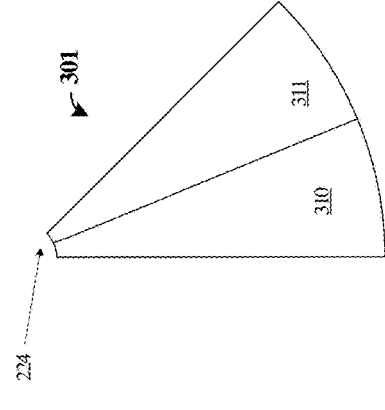
Figure 3:
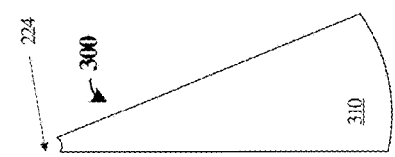
Figure 3:
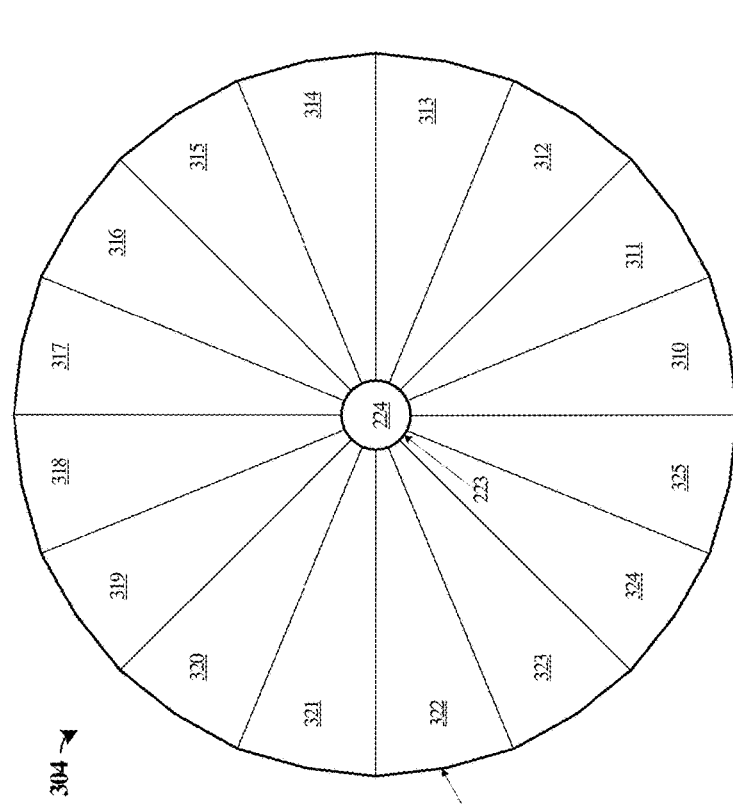

Base layer 214 can include a plurality of radial folds 215 which define sections of base layer 214, also referred to as gores. Although sixteen (16) sections or gores are employed in FIG. 2, a different quantity can instead be used. These sections can include separate arrays or sets of photovoltaic cells, which are arranged to fit onto the particular wedge-like shape of the section or gore, and are further illustrated in view 202. To produce a stowed configuration for solar array assembly 210, base layer 214 can be sequentially folded for establish a compact arrangement and secured onto boom 240. FIG. 3 illustrates an example folding technique for establishing a stowed configuration. To deploy, solar array assembly 210 is released from boom 240, which allows the tensioned elements to exert forces onto base layer 214 which responsively expands and unfolds.

Boom 240 can be configured to solar array assembly 210 in a stowed configuration, such as having base layer 214, photovoltaic elements, perimeter structural element 220, and central tensioner 223 folded and secured onto or wrapped around boom 240 prior to deployment. Boom 240 serves to attach and orient solar array assembly 210 with regard to a spacecraft or vehicle. Boom 240 can be connected to perimeter structural element 220 or tensioner 223 and allows solar array assembly 210 to be positioned relative to solar radiation incidence angles. Boom 240 might have a lenticular or biconvex cross section, as discussed in FIG. 4. Boom 240 can have embossed Kapton used for padding, if desired for the particular application. Boom 240 may be optionally hinged at its base to offset the deployed solar array assembly 210 from the spacecraft to avoid shadowing the photovoltaic elements during operation, and may be controlled or steered to point/orient to solar illumination independently from the spacecraft, with an optional tracking gimbal or motorized hinge.

Views 202-203 illustrate example gore or section 231 defined between two adjacent radial folds 215 of base layer 214. A simplified wedge or trapezoidal shape of section 231 is shown for clarity, and section 231 might instead have various curved edges. In view 202, an array of photovoltaic cells 232 is shown forming a grid or distributed arrangement over a first surface of section 231. This first surface is configured to generally face solar illumination and produce electrical energy which is then routed or distributed on a second surface of section 231. The quantity of individual photovoltaic cells can vary based on the application and to better fit the surface area of section 231, with typically balance achieved between size of the individual cells and the quantity of cells employed on each section. Also, target voltage or current considerations can play into the selection of the quantity, type, or connection scheme for individual photovoltaic cells 232. View 203 shows example control and power link routing for coupling photovoltaic cells 232 into groupings to produce a desired voltage or current. These groupings are then coupled to a main power bus or power link 234 which is routed to wiring harness 241. While a perimeter routing of power/control links is shown in FIG. 2, other configurations are possible. Perimeter routing allows wires to be routed through any tubes or hollow rods that form perimeter structural element 220, such as member 222 and similar members. Wiring harness 241 comprises a mechanical coupling which electrically connects photovoltaic elements to a load or to a remainder of the associated device or vehicle.

The examples above discuss base layer 214 has having a generally membrane-like or film-like configuration with a central tensioning element configured to provide hoop tension about a central node. However, other configurations of base layer 214 are possible. In one example, base layer 214 comprises a woven or mesh substrate which has a pre-loaded tension incorporated into the substrate, such as by being made slightly undersized. Example materials include fabrics or meshes made from fiberglass, Kevlar, Vectran, aromatic polyamide (aramid) materials, or other materials suitable to carry a pre-loaded fabric tension as well as suitable for the environment or application into which the solar assembly is deployed. Corresponding photovoltaic cells can then be bonded directly to substrate, with folds or section divisions used to establish gores/sections for folding into a stowed configuration. A center node or hole can be reinforced to prevent ripping, but in such examples, no central tensioner is required. A perimeter structure can still be included in these alternative examples against which the pre-loaded tension of the substrate acts during and after deployment.

In FIG. 3, several folding or unfolding arrangements for a self-deploying solar assembly are shown. Although the operations of FIG. 3 are discussed in context of the elements of FIG. 2, similar operations can be applied to elements in FIG. 1. Also, the shape of the membrane or base layer in FIG. 3 is shown as generally hexadecagonic (i.e., a sixteen-sided polygon) in shape. It should be understood that circular or other shapes can be employed. The photovoltaic side forming solar array assembly 210 typically folds outward to provide exposure of the photovoltaic cells to solar illumination during stowage and deployment. This operation employs sixteen (16) panel gores (i.e., tapered triangular sections) and 16 radial folds or hinges. The diameter of central void 224 is proportional to a stowed length of solar array assembly 210.

To produce a stowed or folded configuration of solar array assembly 210, base layer 214 is folded four (4) times: half (180°), quarter (90°), eighth (45°), and sixteenth (22.5°). View 300 shows a fully stowed and folded configuration in the "sixteenth" configuration, having only gore 310 visible or deployed with central void 224 partially visible. View 301 shows a partially deployed configuration in the "eighth" configuration, having gores 310 and 311 deployed. View 302 shows a partially deployed configuration in the "quarter" configuration, having gores 310-313 deployed. View 303 shows a partially deployed configuration in the "half" configuration, having gores 310-307 deployed. Finally, view 304 shows a fully deployed configuration, having gores 310-325 deployed. Central void 224 is maintained under tension via the embedded tensioner 223, while the perimeter of solar array assembly 210 receives structural support via perimeter structural element 220. In one example, a fold line of gore 310 might be coupled to boom 240 or to a corresponding spacecraft or vehicle. Thus, view 304 shows a fully deployed configuration of a hubless, hoop-stiffened circular solar array, while view 300 shows a fully stowed or folded configuration.

Figure 4:
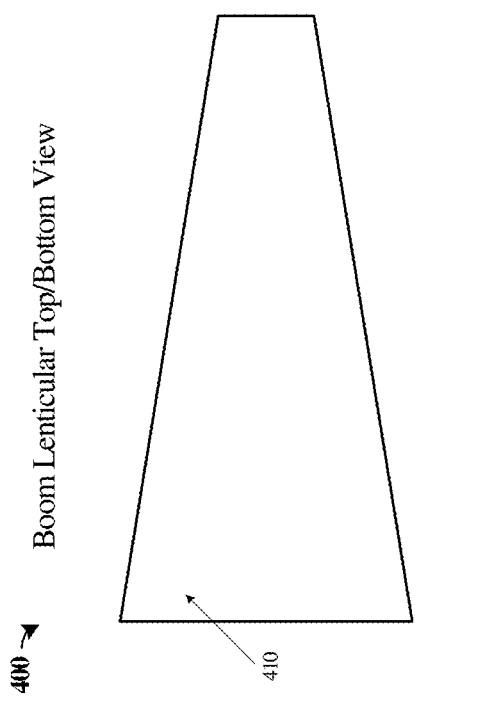
FIG. 4 illustrates a solar array boom configuration in an implementation.
Figure 4:
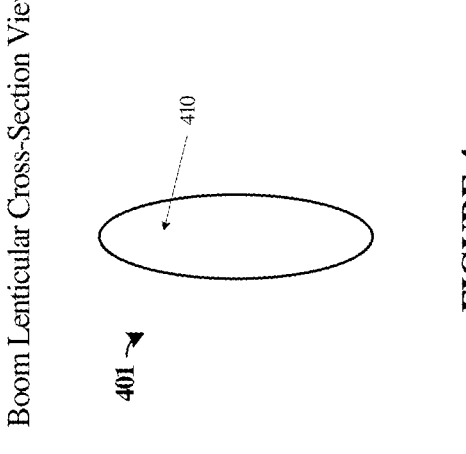

FIG. 4 shows further details a boom used for storage or stowage of a self-deploying solar assembly. View 400 illustrates boom 410 in an overhead or plan view, and view 401 shows a cross-sectional view of boom 410. Boom 410 can have a generally trapezoidal shape when viewed overhead, to mimic the general shape of individual gores of a self-deploying solar assembly. Boom 410 can also have a generally lenticular cross-section, as shown in view 401, about which the individual gores of a self-deploying solar assembly can be wrapped, overlaid, draped, or attached. While a round cross-section, among others, can be employed, the lenticular cross-sectional shape better suits a stackup of many folded layers of a self-deploying solar assembly. Accordingly, boom 410 can be inserted between backside folds of a base layer of a self-deploying solar assembly. Boom 410 can be hinged at a longitudinal end to a host spacecraft or vehicle to provide for a controlled or selectively angled orientation of a solar assembly with respect to the spacecraft or vehicle. The edge of boom 410 can be attached to a fold line of a base layer membrane forming a solar assembly. The rim of base layer membrane forming a solar assembly can be braced to boom 410 with folding struts. When in the stowed configuration, a securing element can be included on or around boom 410 and the self-deploying solar assembly to prevent deployment until commanded or desired. This securing element can include straps or clamps, which can be commanded to separate or release for deployment of the solar assembly. The central tensioning element then responsively deploys a corresponding base layer into a deployed configuration when released from boom 410.

Figure 5:
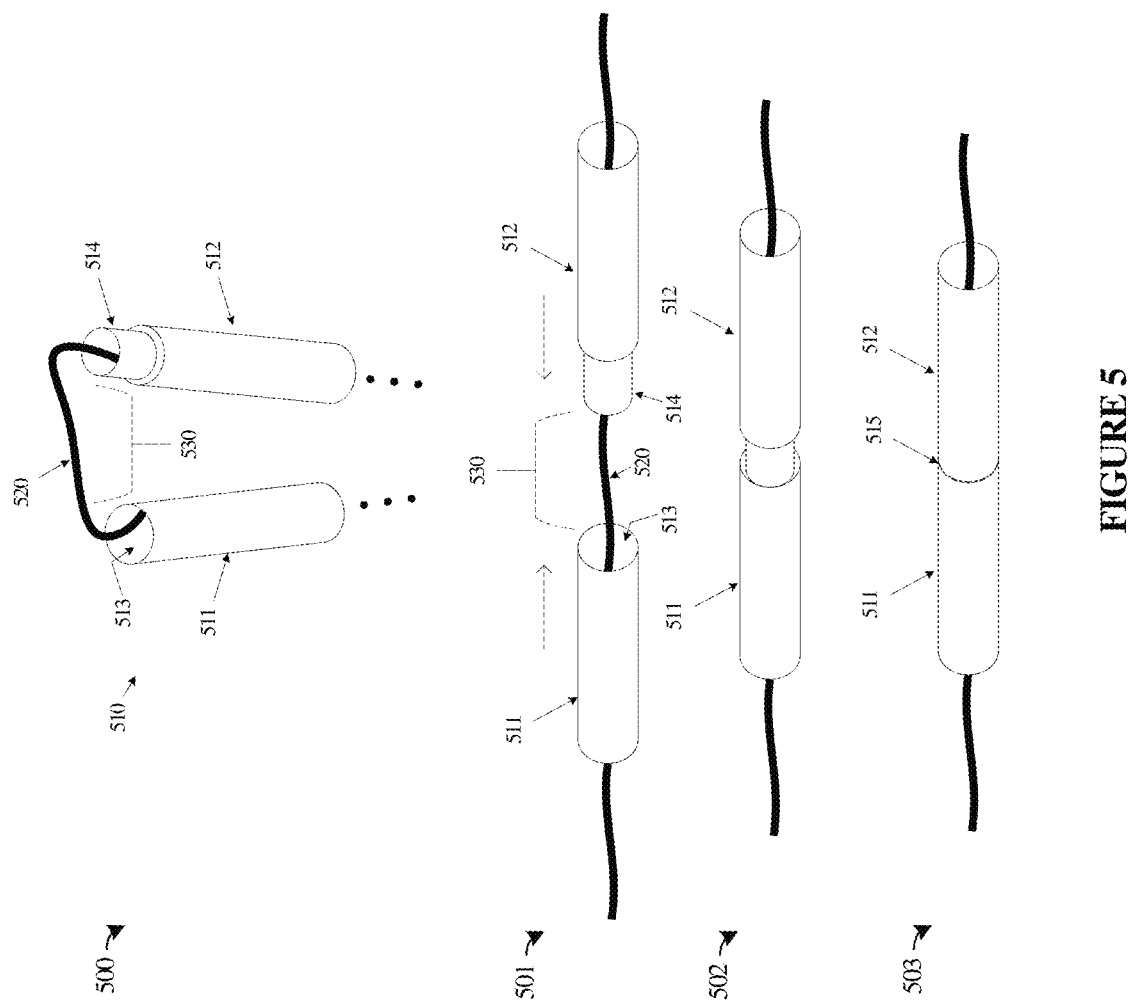
FIG. 5 illustrates a perimeter structure arrangement in an implementation.

FIG. 5 illustrates perimeter structure arrangement 510 in an implementation. Perimeter structure arrangement 510 can be an example of perimeter structural element 112 with perimeter tension element 116 of FIG. 1, or perimeter structural element 220 with perimeter tensioning element 221 of FIG. 2, although variations are possible. Views 500-503 illustrate a partial length of perimeter structure arrangement 510 having two segments 511-512 shown. A series of segments are employed to form a circumferential structural about a solar array, and the quantity of segments typically corresponds to the quantity of gores or sections of the array. View 500 shows a folded configuration, view 501 shows an unfolded but un-seated configuration, view 502 shows a partially interlocked configuration, and view 503 shows a fully interlocked or seated configuration among segments.

Perimeter structure arrangement 510 comprises joints 530 positioned at radial folds in a base layer, and is configured to allow folding of the base layer into a stowed configuration having an exposed area of a single gore. Perimeter structure arrangement 510 comprises a series of hollow members each corresponding to one of the gores and having a tension element 520 threaded therethrough. Tension element 520 of perimeter structure arrangement 510 provides a tension force to unfurl the series of hollow members during deployment of the base layer from the stowed configuration to the deployed configuration. In FIG. 5, the series of hollow members comprise longitudinal ends having interlocking ferrules, noted by nesting features 513-514. These ferrule features can automatically and passively interlock based on deployment and unfurling once a certain angular relationship has been established between adjacent segments.

Tension element 520 can be formed from a various materials, such as a spring, memory metal, elastic bands, shock cords, or other self-tensioning materials. In other examples, one or more discrete tensioning elements can be included, such as springs, inline along the length of a stainless steel or other material that forms a wire, cable, or other circumferential member and provides hoop tension to the circumferential member. Segments 511-512 can be formed from various structural materials, including tubing, fiberglass, carbon fiber, resins, aluminum, stainless steel, other materials.

In alternative arrangements to a hollow tube with internal tension member, individual joints can provide tension for deployment of a perimeter structure. For example, high elasticity joints can be employed which, when bent into the folded configuration, store a spring force or return force to self-deploy. Example materials include superelastic nitinol (>8% clastic recovery), memory materials, polymeric materials, high strain composite materials, lenticular shaped materials, or other materials which produce deployment force from stored strain. Also, double jointed hinges, such as Soss-style hinges, can be employed between segments which can fold and unfold according to a circumferential tension applied. An advantage of high elasticity joints or hinged joints include easier re-folding after deployment when locking features are not employed.

Figure 6:
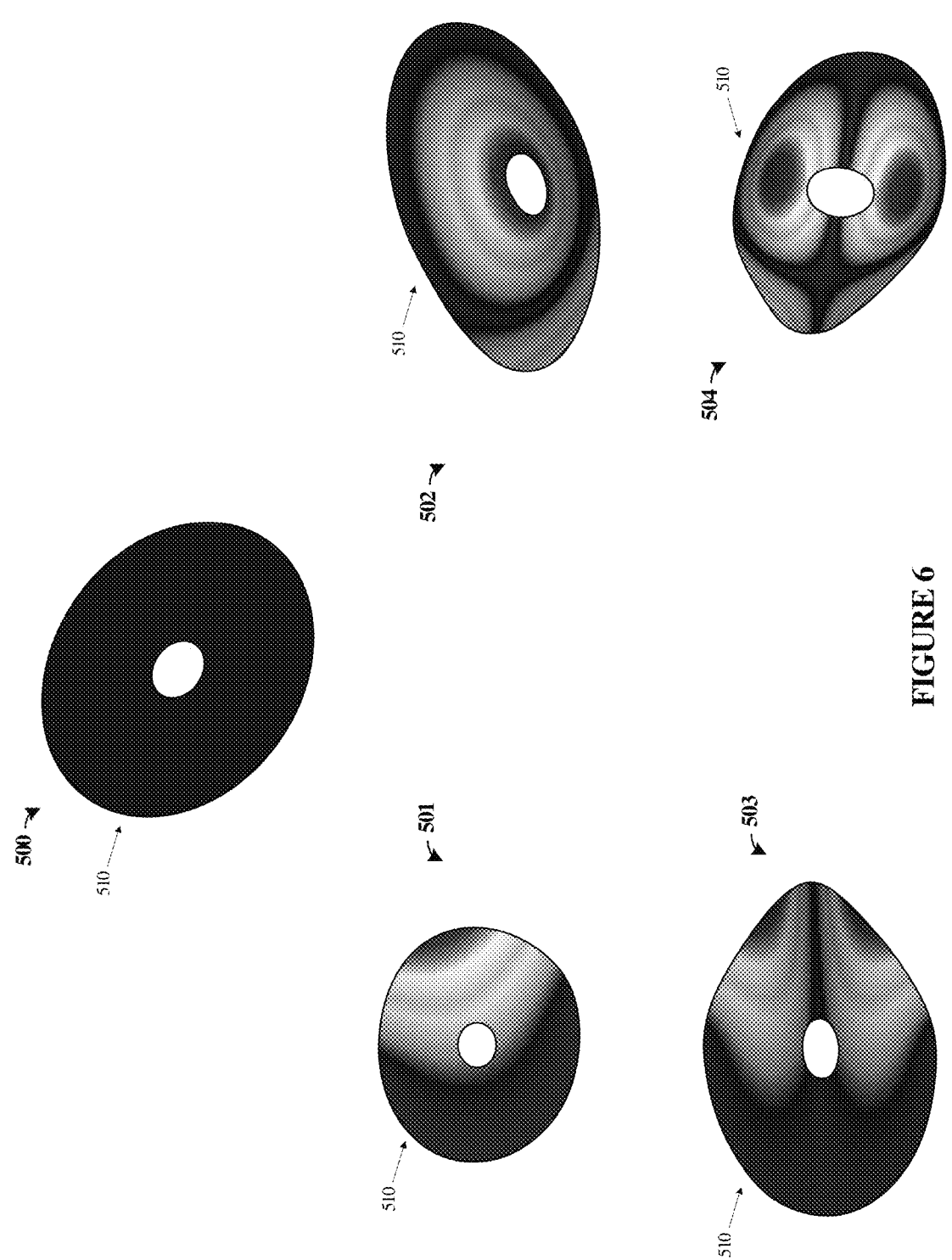
FIG. 6 illustrates vibration modes for a solar array assembly in an implementation.

FIG. 6 illustrates dynamics testing of a self-deploying solar assembly while in a deployed configuration. The modeling and dynamics included in FIG. 6 can apply to any of the example solar array assemblies discussed herein. The generally circular shape of solar array 510 is shown undeformed in view 500. Views 501-504 show various deformation and dynamics configurations with associated stresses and strains of the membrane. FIG. 5 assumes the following parameters for the solar array: a circular solar array having a mass of 5 kilogram (kg) and a 3 meter (m) diameter, with a 12 millimeter (mm) thickness tubular perimeter structure. Such a configuration might have 1.5 kilowatts (KW) worth of photovoltaic cells, depending on the photovoltaic technology employed. Using a dynamics model with 43820 discrete simulated elements, the following deformation modes can be encountered: Mode 1 at 0.84 Hz (bending OP); Mode 2 at 2.10 Hz (drumhead); Mode 3 at 2.61 Hz (bending IP); and Mode 4 at 4.33 Hz (drumhead 2).

Thus, the hoop-stiffened circular form noted herein provides extremely high stiffness for the given mass/weight of a solar array. Several advantages are found for such a solar array. Far fewer parts than many other solar arrays this this array more producible and less expensive. This solar array is stiffer and lighter than rolled arrays or rectangular type arrays. This solar array has an inherently high power/weight and stiffness/weight as well as strength/weight ratio compared to other designs. The compact geometry and fully tensioned membrane inherently have the desirable deployed structural properties without any of the massive amount of spars or complex deployment mechanisms required for other arrays. The enhanced solar arrays discussed herein can be produced without expensive or hard-to-handle composite materials, which drive cost and schedule lead times. Such a solar array does not need to use any foam materials on a back side of a base layer membrane to prevent photovoltaic cell cracking due to excessively small radius of curvature such as used on rolled arrays. This foam degrades on orbit in vacuum and by solar UV and radiation emissions, and can be attacked by atomic oxygen in low earth orbits. This degradation creates array contamination and increases temperature of the solar cells, degrading their power production. This solar array stows more compactly than other arrays, including rolled arrays. This enables high power/volume required for smallsats and constellation launches. This solar array enables use of silicon photovoltaic cell modules to make lightweight high power/weight and power/volume arrays that are simultaneously low $/Watt with excellent structural performance.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The various materials and manufacturing processes discussed herein are employed according to the descriptions above. However, it should be understood that the disclosures and enhancements herein are not limited to these materials and manufacturing processes, and can be applicable across a range of suitable materials and manufacturing processes. Thus, the descriptions and figures included herein depict specific implementations to teach those skilled in the art how to make and use the best options. For the purpose of teaching inventive principles, some conventional aspects have been simplified or omitted. Those skilled in the art will appreciate variations from these implementations that fall within the scope of this disclosure. Those skilled in the art will also appreciate that the features described above can be combined in various ways to form multiple implementations.

What is claimed is:

1. A method, comprising:

forming an assembly comprising a photovoltaic array bonded to a circular and flexible base layer having a plurality of gores interspersed by radial folds that define sections, that when folded, establish a stowed configuration for the assembly with an exposed area of one section;

forming a tension member positioned in a plane of the base layer that establishes a hoop tension about a center of the assembly that applies radial tension onto a material comprising the base layer for deployment of the assembly from the stowed configuration into a deployed configuration; and forming a perimeter structure disposed about outer circumferential edges of the plurality of gores against which the radial tension is conveyed through the material comprising the base layer to provide passive deployment of the plurality of gores from a stowed configuration into a deployed configuration having the base layer in a generally planar arrangement.

2. The method of claim 1, comprising: forming the perimeter structure as comprising joints positioned at the radial folds that provide folding of the base layer into the stowed configuration having an exposed area of a single gore.

3. The method of claim 1, wherein the perimeter structure comprises a series of hollow members each corresponding to one of the sections and having a perimeter tension element threaded therethrough; and wherein the perimeter tension element provides a circumferential tension force to unfurl the series of hollow members during deployment of the assembly from the stowed configuration to the deployed configuration.

4. The method of claim 1, comprising:

establishing the stowed configuration by at least folding the assembly in half over a series of iterations until the exposed area of one section is achieved.

5. The method of claim 4, comprising:

further establishing the stowed configuration by mounting the assembly onto a boom element such that a portion of the photovoltaic array corresponding to the exposed area of one section is configured to receive solar illumination.

6. The method of claim 5, comprising:

establishing the deployed configuration by at least releasing the assembly from the boom element responsive to a commanded release of a securing element, wherein the tension member responsively deploys the base layer into the deployed configuration using the hoop tension that applies the radial tension to the base layer and against a perimeter structure deployed about a circumference of the base layer.

7. A device, comprising:

a solar array assembly comprising photovoltaic elements bonded to a circular and flexible base layer having radial folds that define sections, that when folded, establish a stowed configuration for the solar array assembly with an exposed area of one section;

the solar array assembly comprising a tension member positioned in a plane of the base layer and configured to apply a hoop tension about a center of the base layer that applies radial tension to a material comprising the base layer for deployment of the assembly from the stowed configuration into a deployed configuration; and the solar array assembly comprising a perimeter structure about circumferential edges of the sections against which the radial tension is applied through the material comprising the base layer to provide passive deployment of the sections of the base layer of the solar array assembly into a generally planar arrangement.

8. The device of claim 7, wherein the perimeter structure comprises a series of hollow members each corresponding to one of the sections and having a perimeter tension element threaded therethrough; and wherein the perimeter tension element provides a circumferential tension force to unfurl and interlock the series of hollow members during deployment of the solar array assembly from the stowed configuration to the deployed configuration.

9. The device of claim 7, comprising:

a boom element onto which the solar array assembly is mounted such that a portion of the photovoltaic elements corresponding to the exposed area of one section is configured to receive solar illumination in the stowed configuration and provide electrical power to at least a portion of the device.

* * * * *